United States Patent [19]
Begemann et al.

[11] 3,821,421
[45] June 28, 1974

[54] PROCESS FOR THE FLAVOURING OF FOODS

[75] Inventors: Willem Johan Begemann, Den Haag; Pieter Daniël Harkes, Vlaardingen, both of Netherlands

[73] Assignee: Lever Brothers Company, New York, N.Y.

[22] Filed: July 6, 1971

[21] Appl. No.: 160,116

[52] U.S. Cl.................. 426/65, 260/601, 426/222
[51] Int. Cl............................................. A23l 1/26
[58] Field of Search.......... 99/140 R, 140 N; 426/65

[56] References Cited
UNITED STATES PATENTS
3,655,397   4/1972   Parliment.................... 99/140 R
3,686,003   8/1972   Dorp............................ 99/140 R OTHER PUBLICATIONS
Chemical Abstracts, 74: 12612s (Jan. 1971).

Primary Examiner—Morris O. Wolk
Assistant Examiner—Sidney Marantz
Attorney, Agent, or Firm—Lever Brothers Company

[57] ABSTRACT

A process to impart an improved savoury, in particular chicken flavour to foods in which 4cis-decanal is incorporated in foods such as (dry) soups and ready meals, besides aldehydes having 11–17 carbon atoms and 2–4 double bonds, especially besides 2trans,4cis,-7cis-tridecatrienal and 2trans,6cis-dodecadienal. Instead of the aldehydes, precursors thereof may be used which yield the said aldehydes in situ, for instance the diethyl acetal and 2-(3cis-nonenyl)-thiazolidine-4-carboxylic acid.

The aldehydes and/or their precursors may be incorporated when coated, e.g. in a maltose-dextrin powder containing for instance 0.1–10 mg 4cis-decenal per gram.

The desired amount of 4cis-decanal is 0.003–0.03 mg/kg food product ready for consumption.

24 Claims, No Drawings

PROCESS FOR THE FLAVOURING OF FOODS

The invention relates to a process for the preparation of foods having an improved flavour. More in particular it relates to imparting or enhancing a flavour reminiscent of chicken flavour.

It is known to prepare foods having a chicken flavour by using poultry meat. Although the quality of the preparation cannot be questioned, the flavour is often considered too flat or too slight. To meet this objection, products have been marketed under the name of "chicken flavour," the composition of which has mostly not been disclosed. Among such products applicant has not found any one that solves the above problem. A better approach was disclosed in British patent specification 1,034,352, in which it was proposed to prepare foods having an improved savoury, in particular chicken flavour by incorporating therein aliphatic aldehydes with 11–17 carbon atoms and 2–4 double bonds.

It has now been found, that 4cis-decenal has the remarkable property of enhancing the chicken flavour possibly present in foods; the aldehyde may be incorporated as such or be formed in situ.

In particular it has been found, that a considerable improvement is obtained by incorporating in foodstuffs 4cis-decenal and/or a precursor thereof in addition to the aldehydes known from the cited British patent specification, and/or precursors thereof.

By a precursor of a flavouring agent is understood a compound which, when incorporated in the food, is converted into the flavouring agent under the conditions of manufacture, storage or preparation for immediate consumption of the food. A precursor is used to overcome problems involved by the use of the flavouring agent itself.

The invention therefore relates to a process of preparing food products with an improved flavour, characterized in that the aldehyde 4cis-decenal and/or a precursor thereof, which, when incorporated in the food product, is converted into the aldehyde mentioned under the conditions of manufacture, storage or preparation for immediate consumption of the food product, is incorporated in the food product in addition to one or more aldehydes with 11–17 carbon atoms and 2–4 double bonds and/or precursors thereof.

These unsaturated aldehydes may be incorporated at the same time as 4cis-decenal or a precursor thereof, but may also be present in the constituents to be used for preparing the food or be formed in situ from a precursor as described in the cited British Patent specification.

In addition to these aldehydes or their precursors other flavouring agents may be incorporated in the food product, as the purpose may require.

In particular, in addition to 4cis-decenal and/or a precursor thereof, the aldehydes 2,4,7-tridecatrienal and/or 2,6-dodecadienal or a precursor thereof are used, preferably those isomers having as many cisdouble bonds as possible, viz. 2trans,4cis,7cis-tridecatrienal and 2trans,6cis-dodecadienal.

Precursors of 4cis-decenal are e.g. functional derivatives of the aldehyde, such as the acetals, in particular the diethylacetal, the acylates, in particular the diacetate, enol ethers, enol esters and bisulfite compounds of the 4cis-decenal, and thiazolidine derivatives derived from 4cis-decenal by reacting the aldehyde with organic compounds having an —NH-group and an SH-group on adjacent carbon atoms, in particular those formed by reaction of the aldehyde with cystein, $\beta$-lactoglobulin and glutathion. By reaction with cystein e.g. the new substance 2-(3cis-nonenyl)-thiazolidine-4-carboxylic acid is formed, which can be converted into its salts or esters by known methods.

The food products which can be flavoured according to the invention are, in particular, soups, preferably dry soups, ready meals, chicken gravy and bouillon cubes, pies, ragout, snacks, croquettes, meat balls, salads and sausages with chicken meat, vegetable protein products to which it is desired to impart a chicken flavour, and in which, if desired, chicken meat provides part of the flavour.

The flavouring agents according to the invention can also be incorporated in a flavouring composition which can be used for the manufacture or the preparation of the food product; a flavouring composition of this type comprises the flavouring agents incorporated in an edible carrier or diluent. Such a carrier or diluent may be an ingredient or a mixture of ingredients for the food, which then contains an amount of 4cis-decenal or a precursor of 4cis-decenal adjusted to the particular food. Preferably, 4cis-decenal or its precursor is incorporated together with aldehydes known from British patent specification 1,034,352.

The compounds according to the invention may also be incorporated in concentrated liquid or solid flavouring agents, such as sprinkling powders, to be used by the consumer for adjusting the flavour of meals, either in the kitchen or at the table.

The amount of 4cis-decenal in the food ready for consumption may vary between 0.003 and 0.03 mg/kg, preferably between 0.006 and 0.015 mg/kg; precursors of 4cis-decenal may be incorporated in the food in such a quantity that the amount of aldehyde formed in the ready food lies within the above range.

The amounts of 2trans,4cis,7cis-tridecatrienal and of 2trans,6cis-dodecadienal, based on the amount of 4cis-decenal, may vary between 1–6 parts by weight of the tridecatrienal and 0.1–0.5 parts by weight of the dodecadienal per part by weight of the decenal, preferably between 2 and 5, and 0.2 and 0.4 parts by weight, respectively. In particular cases also larger or smaller amounts may be applied.

The amount of the flavouring substance in a concentrated flavouring agent, such as a sprinkling powder, may also vary between wide limits, which are also dependent on other substances incorporated in the agent; a suitable amount is e.g. 22.5 mg/kg sprinkling powder.

Besides by using precursors, it is also possible to solve the problem of the keepability of the aldehyde by bringing the aldehyde into a stabilized form, such as by encapsulation or coating, e.g. with fat, gelatin or gum arabic. A very satisfactory form is the product obtained by suitably dehydrating a solution of the flavouring agents according to the invention in a concentrated solution of maltose-dextrin, preferably by lyophilization or spray-drying. The stabilized forms obtained, in particular those in maltose-dextrin, are very suitable for dosing the flavouring agents according to the invention. The amount of the flavouring agent therein is not, of course, bound to certain limits: a suitable amount is e.g. 0.1–10 mg/g, but it is also possible to use larger or smaller quantities.

The above stabilized forms may also be mixed with one of the ingredients to be used for preparing the food, or with a proportion of such ingredients, or with a mixture of ingredients.

The compounds according to the invention may be used in conjunction with other substances useful for the required purpose. Thus it is possible to use one or more of the compounds belonging to one or more of the classes listed below, although the choice is not restricted to these compounds:

a. amino acids, which can be obtained by any traditional process from vegetable or animal proteins, such as gluten, casein, zein, soya protein, etc.;

b. peptides of similar origin, as well as peptides such as alanylalanine, alanylphenylalanine, alanylasparagine, carnosine and anserine;

c. nucleotides such as adenosine, guanosine, inosine, xanthosine, uridine and cytidine 5'-monophosphates, as well as their amides, deoxy derivatives, salts, etc.;

d. monocarboxylic acids, such as saturated or unsaturated fatty acids, for example those with 2-12 carbon atoms, lactic acid, glycollic acid and $\beta$-hydroxybutyric acid, as well as dicarboxylic acids such as succinic acid and glutaric acid;

e. pyrrolidonecarboxylic acid and its precursors;

f. natural sweeteners such as mono- and disaccharides, and artificial sweeteners such as saccharin and cyclamates;

g. 4-hydroxy-5-methyl-2,3-dihydrofuran-3-one and 4-hydroxy-2,5-dimethyl-2,3-dihydrofuran-3-one;

h. products from the reaction of sulphur-containing amino acids or hydrogen sulphide with reducing sugars or ascorbic acid, or the compounds mentioned under (g) or lower aliphatic aldehydes and ketones;

i. sulphur compounds such as hydrogen sulphide, thiols, sulphides and disulphides, for example, dimethyl sulphide and diallyl sulphide; also 2-acetylthiazole and 2-acetyl-2-thiazoline;

j. guanidines, such as creatine and creatinine;

k. salts, such as sodium chloride and mono- and disodium and ammonium phosphates;

l. organic phosphates, such as amino acids containing phosphorus;

m. nitrogen compounds which have not been mentioned above, such as ammonia, amines, urea, indole and skatole;

n. 4- and 5-alkanolides as well as the esters and salts of the corresponding hydroxy acids, such as 5-decanolide, 5-dodecanolide, sodium 5-hydroxydecanoate and the glycerides of 5-hydroxyalkanoic acids, such as the product from the reaction of 5-alkanolides with glycerol;

o. aldehydes such as ethanal, propanal, 4-heptenal;

p. ketones, such as methylketones with, for example 5-15 carbon atoms, biacetyl, etc.;

q. esters of 3-oxoalkanoic acids, such as the glycerol esters;

r. tricholominic and ibotenic acid and their salts;

s. flavouring compounds, such as o-aminoacetophenone, N-acetonyl-pyrrole, maltol, isomaltol, ethylmaltol, vanillin, ethylvanillin, cyclotene (2-hydroxy-3-methyl-2-cyclopentene-1-one), ethone [1-(p-methoxy-phenyl)-1-pentene-3-one], coumarin, ethoxymethylcoumarin, etc.;

t. alcohols, such as ethanol and octanol;

u. colourants, such as turmeric and caramel;

v. thickeners, such as gelatin and starch;

w. emulsifiers, such as the monoglycerides of diacetyltartaric acid.

The quantity of these substances used depends on the nature of the food and that of the other ingredients added, such as herbs and spices, as well as on the odour or flavour desired.

The flavouring agents according to the invention can be incorporated in conjunction with the flavouring substances enumerated above in maltosedextrin or another stabilized form, or also in one of the ingredients for the preparation of the food, as set out above.

4cis-decenal can be prepared by partial catalytical reduction of 4-decynal, or by hydrolysis of the diethyl acetal which can be obtained by converting 3cis-nonenylmagnesium bromide with triethoxymethane; 1,1-di-ethoxy-4cis-decene is a new compound. The derivatives of the aldehyde can also be prepared by means of methods known from the literature.

EXAMPLE 1

Chicken fat (298.6 g) was melted; to this melt 1.25 g groundnut oil was added, in which 2trans,4cis,7cis-tridecatrienal (5.4 mg) and 2trans,6cis-dodecadienal (0.345 mg) had been dissolved. To one half of this chicken fat 0.15 g groundnut oil was added, in which 4cis-decenal (0.9 mg) had been dissolved; in the other half an equal amount of groundnut oil was incorporated without additive. From both portions of chicken fat a dry soup mixture was prepared according to the composition given below:

|  | Parts by weight |
|---|---|
| Minced chicken fat | 3.0 |
| Ground chicken meat | 4.0 |
| Salt | 8.0 |
| Monosodium glutamate | 6.0 |
| Dextrose | 3.0 |
| Onion powder | 0.7 |
| Enzymatically hydrolysed yeast | 0.5 |
| Curcuma | 0.12 |
| Parsley | 0.04 |
| Sage | 0.01 |
| Noodles | 32.0 |

From both mixtures a soup was prepared by simmering 57 g with 800 ml water for 7 min. Both soups were compared in a triangle test by an expert panel of 23 persons, 16 of whom tested correctly (significance $p = 0.001$); 9 of these 16 persons preferred the soup containing 4cis-decenal (0.0225 mg/kg) (significance $p = 0.05$). The significance was determined according to the table of K. Bengtsson, Wallerstein Laboratories Comm. 16, 231 (1953).

EXAMPLE 2

4cis-decenal was synthesized as follows: From the magnesium compound of 1-heptyne (b.p. 99.5°–100.5°C, $n_D^{20} = 1.4084$, purity according to GLC: 96 percent, prepared according to Jenny and Meyer, Angew.Chem. 71, 245–246 (1959), from 1-bromopentane and sodium acetylide in dimethylformamide) 3-nonyn-1-ol was prepared by reaction with ethylene oxide according to Knight and Diamond, J.Org.Chem. 24, 400–403 (1959), which after conversion into the tetrahydro-pyranyl ether was purified by distillation. The nonynol, which was recovered after decomposition of the ether by boiling with methanol and p-toluene sulphonic acid according to Van der Steen et. al., Rec.Trav.Chim. 82, 1015–1025 (1963), had a purity (GLC) of 99 percent. (B.p. 108.5°–109°C/16 mm Hg, $n_D^{20}$=1.4559). By partial hydrogenation with 10 percent Lindlar catalyst and 4 percent quinoline, 3cis-nonen-1-ol was obtained; b.p. 103°–104°C/15 mm Hg, $n_D^{20}$=1.4488, purity (GLC) 95 percent. It was converted according to the method of Hunsdiecker, Ber. 75, 460–468 (1942), with PBr$_3$ into 1-bromo-3cis-nonene; b.p. 78°–81°C/5mm Hg. $n_D^{20}$=1.4707.

1-bromo-3cis-nonene (15.6 g = 0.076 mole), dissolved in ether (50 ml), was converted in the usual way with magnesium (1.82 g = 0.076 mole) into the magnesium compound. The solution was cooled to +5°C and triethoxymethane (12.4 g = 0.084 mole) was rapidly added. Subsequently, the reaction mixture was heated to boiling for 6 h. Water (50 ml) was added to it, followed by such an amount of 10 percent hydrochloric acid as to bring the pH to 6.5–7.

The ether layer was separated off and the water layer extracted with ether (50 ml). After drying of the ethereal solution with anhydrous MgSO$_4$, the solvent was evaporated and the residue, 1,1-diethoxy-4cis-decene, was distilled; b.p. 57.5°–67°C/0.02 mm Hg, $n_D^{20}$=1.4344; yield 60 percent.

The diethylacetal was hydrolysed by oxalic acid in an aqueous acetone solution according to the method of Winter, Helv.Chem.Acta 46, 1792–1797 (1963). Yield 82 percent 4cis-decenal, b.p. 51°–52.5°C/0.9 mm Hg, $n_D^{20}$=1.4429, purity (GLC) 94 percent. IR absorption bands of the cis-double bond were clearly present, whereas those of a trans-double bond were absent. The 2,4-dinitrophenyl-hydrazone, prepared in the usual manner from the aldehyde, melted at 73.8–74.4°C, and gave a micro-element analysis in accordance with the gross formula.

EXAMPLE 3

0.0675 g 4cis-decenal, 0.27 g 2trans,4cis, 7cis-tridecatrienal and 0.0173 g 2trans,6cis-dodecadienal were dissolved in 500 ml of a 50 percent solution of maltose-dextrin in water, and intimately mixed. The solution was lyophilised. The powder obtained contained 0.27 mg 4cis-decenal, 1.08 mg 2trans,4cis,7cis-tridecatrienal and 0.069 mg 2trans,6cis-dodecadienal per gram.

EXAMPLE 4

A solution of 180 mg 4cis-decenal in 1 ml 100 percent ethanol was added to a solution of 134.2 mg cysteine in 1 ml distilled water; after thorough mixing the mixture was kept overnight at 0–4°C. The mass formed was comminuted and stirred with 2 ml 100 percent ethanol; the precipitate was centrifuged off and the supernatant liquid carefully removed by means of a pipette. After drying of the solid over calcium chloride, 132 mg (51 percent theor.) 2-(3cis-nonenyl)-thiazolidine-4-carboxylic acid was obtained; m.p. — with decomposition — 133°–137°C. NMR (solvent: deuterated pyridine; internal standard: tetramethylsilane) showed signals at $\delta$=0.87 (distorted triplet), 1.03—1.62 (complex), 1.68–2.56 (complex), 2.99–3.59 (complex), 4.05–4.33 (double doublet), 4.69–4.96 (double triplet) and 5.44 ppm (complex).

By means of an etheral diazomethane solution the methyl ester was prepared. This ester showed the following absorption peaks in the infrared spectrum: 3,320, 2,030, 1,705, 1,658, 1,442, 1,345, 1,230, 1,205, 1,182, 1,030, 825, 795 and 725 cm$^{-1}$; the mass spectrum of the methyl ester had a molecule ion peak for $m/e$ 271, and further peaks for $m/e$ 224 (20), 212 (23) and 149 (100), the relative intensities in relation to that of the peak for $m/e$ 149 being given in parenthesis.

EXAMPLE 5

A chicken ragout was composed from the following ingredients:

| | g |
|---|---|
| Flour | 54 |
| Margarine | 54 |
| Chicken soup meat (with bone) | 90 |
| Mushrooms | 94 |
| Salt | 2.25 |
| Pepper | 0.0375 |
| Protein hydrolysate | 0.0375 |
| Maltose-dextrin powder, prepared according to Example 3 | 0.075 |
| Water | 300 |

From the chicken soup meat and the water, bouillon was drawn in a pressure-cooker for 1 h. The boiled meat was removed from the bouillon and deboned; this yielded about 56 g meat. The bouillon was filtered and supplemented to 300 ml. The margarine was melted and the flour and the bouillon were alternately added in portions with intensive stirring, to prevent burning. After all the flour and the bouillon had been added, the other ingredients were added, after which the whole was left to simmer for 5 min.

In the same way a "blank" ragout was prepared with unflavoured maltose-dextrin powder, and compared with the flavoured ragout. The latter had a richer flavour, more resembling that of cooked chicken meat.

EXAMPLE 6

Pâté was prepared from the following ingredients:

| | Parts by weight |
|---|---|
| Pig liver | 25 |
| Chicken meat | 150 |
| Flour | 40 |
| Hardened fat (m.p. about 37°C) | 25 |
| Thyme | 0.5 |
| Mace | 0.5 |
| Monosodium glutamate | 0.5 |
| Onion powder | 0.5 |
| Pepper | 0.5 |
| Salt | 5 |
| Maltose-dextrin powder, prepared according to Example 3 | 0.05 |
| Water | 250 |

The pig liver was cooked with 150 parts by weight of water for 30 min. Subsequently, the liver was taken from the cooking liquor and, after draining, finely ground in a mincer.

The chicken meat, thyme and mace were cooked for 45 min with 500 parts by weight of water. The meat was taken from the cooking liquor and, after draining, also finely ground in a mincer.

The ground liver and the ground chicken meat were thoroughly mixed for 8 min in a mixer with 100 parts by weight of water and with the salt, the monosodium glutamate, the onion powder, the pepper and the fat. The flour was stirred with 150 parts by weight of water, the flavoured maltose-dextrin powder was added and the meat mixture was mixed with it. The whole mixture was heated to boiling until it had a good thickness.

The pâté obtained had the pleasant flavour of chicken liver pie.

EXAMPLE 7

A dry soup product was composed by intensive mixing from:

|  | Parts by weight |
|---|---|
| Chicken meat, freeze-dried | 9.75 |
| Hardened fat (m.p. about 37°C) | 39 |
| Sugar | 17 |
| Mixture of dehydrated chicken bouillon and salt (1:1) | 0.25 |
| Oxidized potato starch | 7 |
| Vermicelli | 360 |
| Salt | 86 |
| Pepper essence | 0.32 |
| Thyme essence | 0.02 |
| Clove essence | 0.28 |
| Curcuma | 0.35 |
| Celery salt (1:2) | 2.25 |
| Monosodium glutamate | 22 |
| Onion powder | 4 |
| Parsley, freeze-dried | 0.8 |
| Maltose-dextrin powder, prepared according to Example 3 | 0.33 |

From 55 g of this mixture, after stirring with 1 l water and simmering for 10 min, soup was obtained having the pleasant flavour of chicken soup.

EXAMPLE 8

A sprinkling powder was prepared in the usual way from:

|  | Parts by weight |
|---|---|
| Monosodium glutamate | 4 |
| Salt | 7 |
| Protein hydrolysate, powdered | 4 |
| Pepper | 0.02 |
| Bayleaf, powdered | 0.02 |
| Cloves, powdered | 0.02 |
| Onion, powdered | 1 |
| Yeast extract | 1.5 |
| Maltose-dextrin powder, prepared according to Example 3 | 2.44 |

By adding 100 mg to 1 l chicken soup, a soup was obtained with a richer and more pronounced flavour.

EXAMPLE 9

To melted chicken fat (398 g), a solution of 2trans,4-cis,7cis-tridecatrienal (4 mg) and 2trans,6cis-dodecadienal (0.26 mg) in 2 g groundnut oil was added, and well mixed.

Potato starch (15 g) and 2-(3cis-nonenyl)-thiazolidine-4-carboxylic acid (150) were thoroughly mixed.

A dry soup mix was prepared with these two ingredients by mixing:

|  | Parts by weight |
|---|---|
| Aromatized chicken fat | 4 |
| Aromatized potato starch | 0.0015 |
| Chicken meat, minced | 3.1 |
| Salt | 8.5 |
| Pepper | 0.032 |
| Thyme | 0.0025 |
| Cloves | 0.018 |
| Celery on salt (1:2) | 0.226 |

|  | Parts by weight |
|---|---|
| Onion powder | 0.42 |
| Sugar | 1.7 |
| Vermicelli | 32.0 |

By simmering 50 g of this dry soup mix with 1 l water for 7 min, a soup was obtained with a flavour more reminiscent of cooked chicken meat.

EXAMPLE 10

A flavouring composition was prepared by mixing:

|  | Parts by weight |
|---|---|
| Salt | 0.5 |
| Pepper | 0.2 |
| Monosodium glutamate | 1.5 |
| Protein hydrolysate | 2.3 |
| Maltose-dextrin powder, prepared according to Example 3 | 3.0 |

This composition can be used instead of the aromatized maltosedextrin powder mentioned in the following Examples in the amounts indicated:

| Example: | Amount: |
|---|---|
| 5 | 200 mg |
| 6 | 150–250 pts by wght |
| 7 | 100 pts by wght |

We claim:

1. A process of imparting a savory or chicken flavor to food products comprising adding to said food products a member selected from the group consisting of 4cis-decenal, a precursor of 4cis-decenal and mixtures thereof, and (b) a member selected from the group consisting of aldehydes having from 11 to 17 carbon atoms and from 2 to 4 double bonds, precursors of said aldehydes and mixtures thereof, said precursors of 4cis-decenal forming the said aldehyde in the food product during manufacture, storage or preparation for consumption.

2. A process according to claim 1 wherein the 11 to 17 carbon aldehyde is selected from the group consisting of 2,4,7-tridecatrienal, 2,6-dodecadienal and precursors thereof.

3. A process according to claim 2 wherein the 11 to 17 carbon aldehyde is selected from the group consisting of 2trans, 4cis,7cis-tridecatrienal, 2trans,6cis-dodecadienal and precursors thereof.

4. A process according to claim 1 wherein the concentration of component (a) in the food product is between 0.003 to 0.03 mg/kg.

5. A process according to claim 4 wherein said concentration is between 0.006 to 0.015 mg/kg.

6. A process according to claim 1 wherein the precursor of 4cis-decenal is a derivative of 4cis-decenal.

7. A process according to claim 6, characterized in that the precursor is the reaction product of 4cis-decenal and β-lacto-globuline.

8. A process according to claim 6, characterized in that the precursor is 2-(3cis-nonenyl)-thiazolidine or a derivative thereof.

9. A process according to claim 8 wherein the precursor is selected from the group consisting of 2-(3cis-nonenyl)-thiazolidine-4-carboxylic acid and a derivative thereof.

10. A process according to claim 1 wherein component (a) is first taken up in an edible carrier of diluent, and subsequently incorporated into the food product.

11. A process according to claim 10 wherein the edible carrier or diluent is a constituent of the food product.

12. A process according to claim 10 wherein component (a) is incorporated into an edible powder in a quantity facilitating measurement of the desired amount to be added to the food product.

13. A process according to claim 12, characterized in that 0.1–10 mg 4cis-decenal or a corresponding amount of a precursor thereof is incorporated per gram edible powder.

14. A process according to claim 12 wherein component (a) is incorporated into maltose-dextrin by dispersing the component in a concentrated aqueous solution of maltose-dextrin and drying the dispersion obtained.

15. A process according to claim 14 wherein the dispersion is dried by freeze-drying.

16. A process according to claim 14 wherein the dispersion is dried by spray drying.

17. A process for the preparation of a liquid or solid flavoring concentrate comprising admixing 4cis-decenal, a precursor of 4cis-decenal or mixtures thereof with other flavoring agents.

18. A food product comprising 0.003–0.03 mg 4cis-decenal per kg.

19. An ingredient for food products comprising at least one of a member selected from the group consisting of 4cis-decenal a precursor of 4cis-decenal or mixtures thereof.

20. An ingredient for food products according to claim 19 containing 1,1-diethoxy-4cis-decene.

21. An ingredient for food products according to claim 19 containing 2-(3cis-nonenyl)-thiazolidine-4-carboxylic acid.

22. A flavoring composition for a food product, said composition containing a member selected from the group consisting of 4cis-decenal, a precursor of 4cis-decenal and mixtures thereof in a quantity facilitating measurement of the desired amount of said member to be added to the food product.

23. A flavoring composition according to claim 22 containing per gram 0.1–10 mg 4cis-decenal or a corresponding amount of a precursor thereof.

24. A liquid or solid flavoring concentrate comprising at least one of a member selected from the group consisting of 4cis-decenal, a precursor of 4cis-decenal, or mixtures thereof.

* * * * *